(12) United States Patent
Jin et al.

(10) Patent No.: US 9,998,782 B2
(45) Date of Patent: Jun. 12, 2018

(54) DVR SERVICE INCLUDING A SYNCHRONIZATION SERVICE

(71) Applicant: Verizon Patent and Licensing Inc., Arlington, VA (US)

(72) Inventors: Zhiying Jin, Lexington, MA (US); Sandeep G. Rathi, Lexington, MA (US); Ian M. Smith, Cambridge, MA (US); Ravi Kalluri, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days. days.

(21) Appl. No.: 15/336,845

(22) Filed: Oct. 28, 2016

(65) Prior Publication Data

US 2018/0124447 A1    May 3, 2018

(51) Int. Cl.
*H04N 21/4147* (2011.01)
*H04N 21/433* (2011.01)
*H04N 21/43* (2011.01)
*H04N 21/458* (2011.01)
*H04N 21/44* (2011.01)

(52) U.S. Cl.
CPC ..... *H04N 21/4147* (2013.01); *H04N 21/4302* (2013.01); *H04N 21/4334* (2013.01); *H04N 21/44* (2013.01); *H04N 21/458* (2013.01)

(58) Field of Classification Search
CPC ......... H04N 21/26283; H04N 21/4147; H04N 21/4302; H04N 21/4334; H04N 21/44; H04N 21/458
See application file for complete search history.

(56) References Cited

U.S. PATENT DOCUMENTS

2015/0071621 A1*  3/2015  Babu ..................... G11B 19/02
                                                       386/291
2017/0048575 A1*  2/2017  Baumgartner ........... H04N 5/76

* cited by examiner

*Primary Examiner* — Hunter B Lonsberry

(57) ABSTRACT

A method, a system, and a non-transitory storage medium provides to store first recording information that indicates programs that are recorded and stored at user devices, and programs to be recorded and stored at the user devices, receive, from a user device, a message that includes second recording information, wherein the second recording information includes second data instances; compare a portion of the first recording information with the second recording information; determine whether there is a difference between each first data instance relative to each corresponding second data instance; determine a master source for each first data instance that differs from each corresponding second data instance; update each first data instance that differs, one of the network device or the user device based on the master source, and provide the DVR service based on an updated portion of the first recording information, an updated second recording information, or both.

20 Claims, 14 Drawing Sheets

| STORAGE INFORMATION | | | RECORDING INFORMATION | | | | |
|---|---|---|---|---|---|---|---|
| TOTAL SPACE | USED SPACE | FREE SPACE | REC ID | REC HASH | INTERVAL HASH | REC SIZE | REC STATE |
| 2 TB | 1 TB | 1 TB | ASFD2 | 12345G | 0 | 0 GB | SCHEDULED |
| 1 TB | 375 GB | 625 GB | BEW23 | HG2A00 | 1 | .5 GB | RECORDING |
| ••• | ••• | ••• | ••• | ••• | ••• | ••• | ••• |
| 500 GB | 10 GB | 490 GB | 2566B | 150GY3 | 4 | 3 GB | RECORDED |
| ↑ 305 | ↑ 310 | ↑ 315 | ↑ 320 | ↑ 325 | ↑ 330 | ↑ 335 | ↑ 340 |

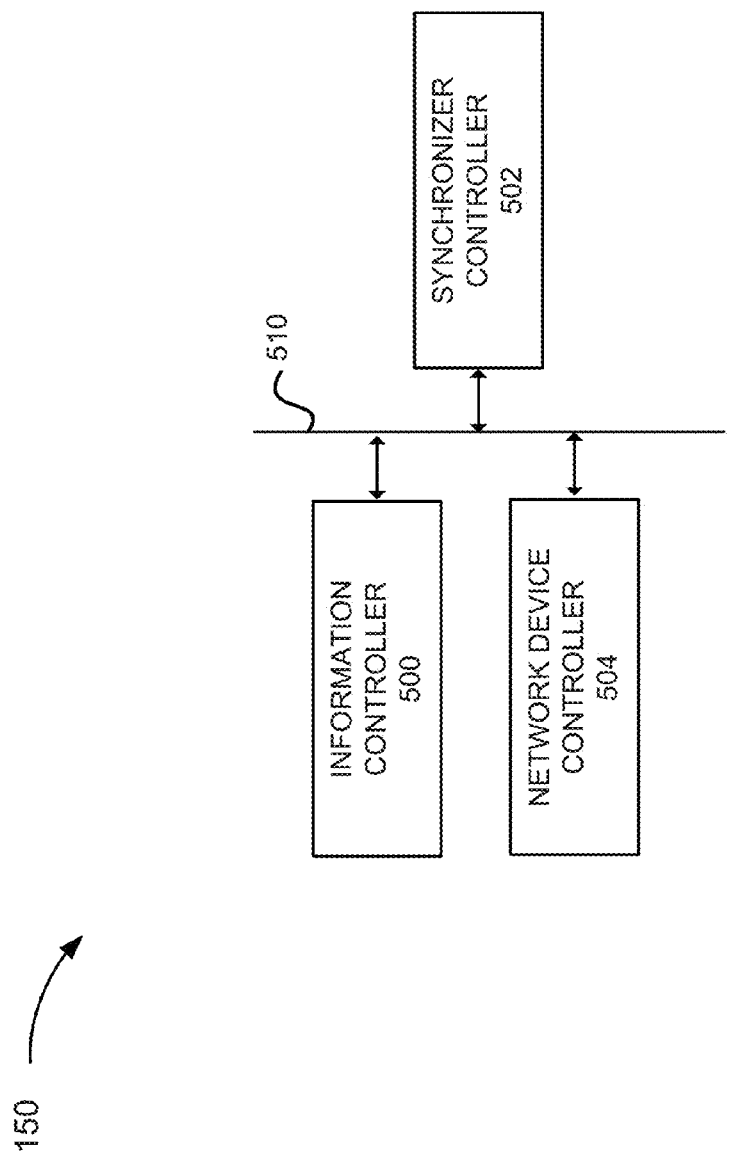

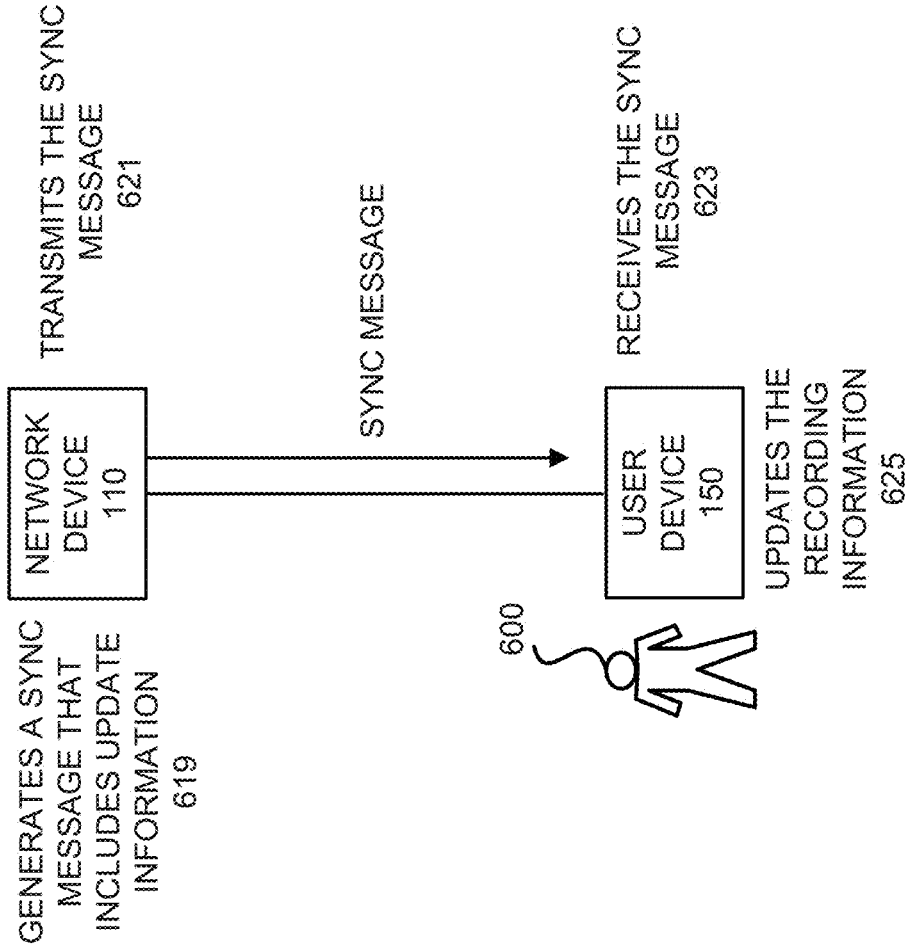

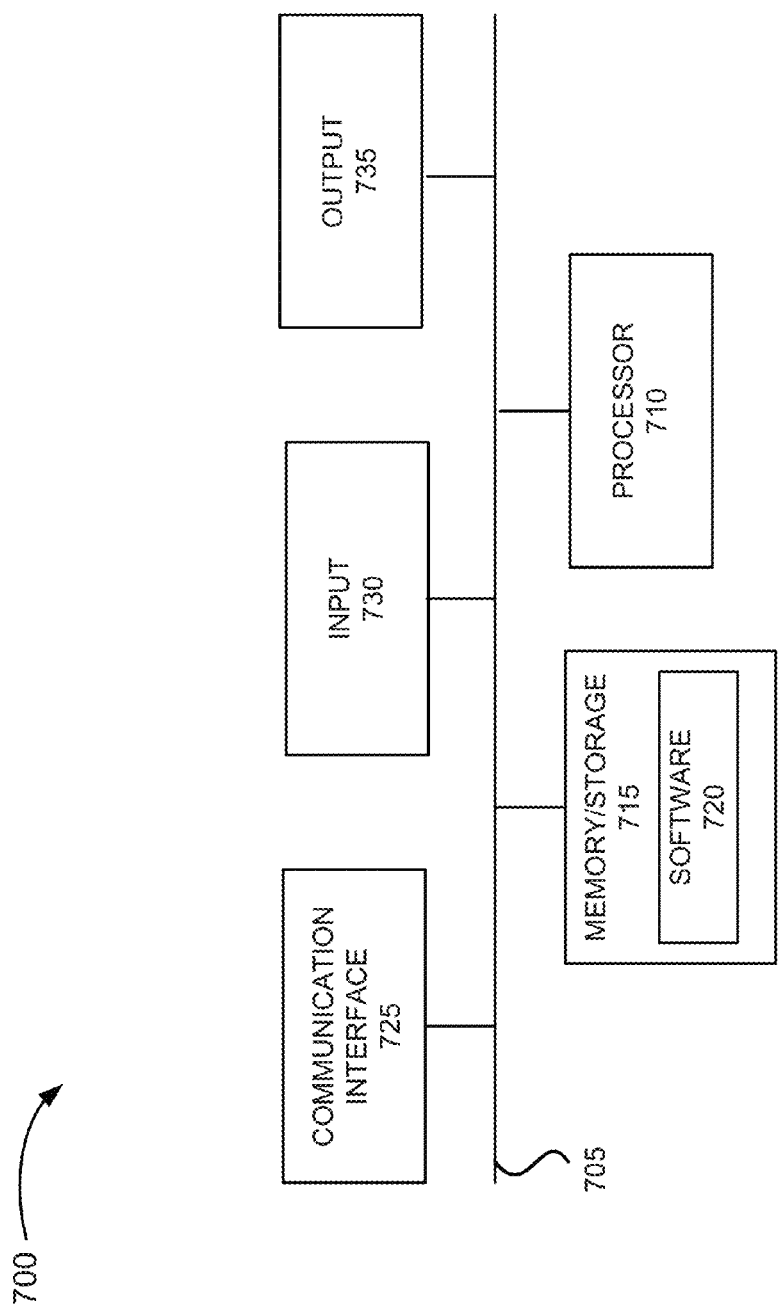

us 9,998,782 b2

DVR SERVICE INCLUDING A SYNCHRONIZATION SERVICE

BACKGROUND

A user may use a digital video recorder (DVR) device to record a program for later viewing. For example, according to a hybrid cloud-based DVR architecture, the DVR device may be a user device that stores the program, and a cloud device manages a DVR service. In view of this architecture, the DVR device communicates with the cloud device, which may be managed by a provider of the program, in order to provide the DVR service. For example, the DVR device communicates with the cloud device in order to record a program, play a program, and receive other services offered under the DVR service.

BRIEF DESCRIPTION OF THE DRAWINGS

FIG. 3 is a diagram illustrating a table that stores exemplary synchronization information;

FIG. 5 is a diagram illustrating exemplary elements of a user device that provide an exemplary embodiment of the synchronization service;

FIGS. 6A-6C are diagrams illustrating an exemplary process of the synchronization service;

FIG. 7 is a diagram illustrating exemplary components of a device that may correspond to the network device and the user device depicted in FIG. 1;

DETAILED DESCRIPTION OF PREFERRED EMBODIMENTS

Figure 1:
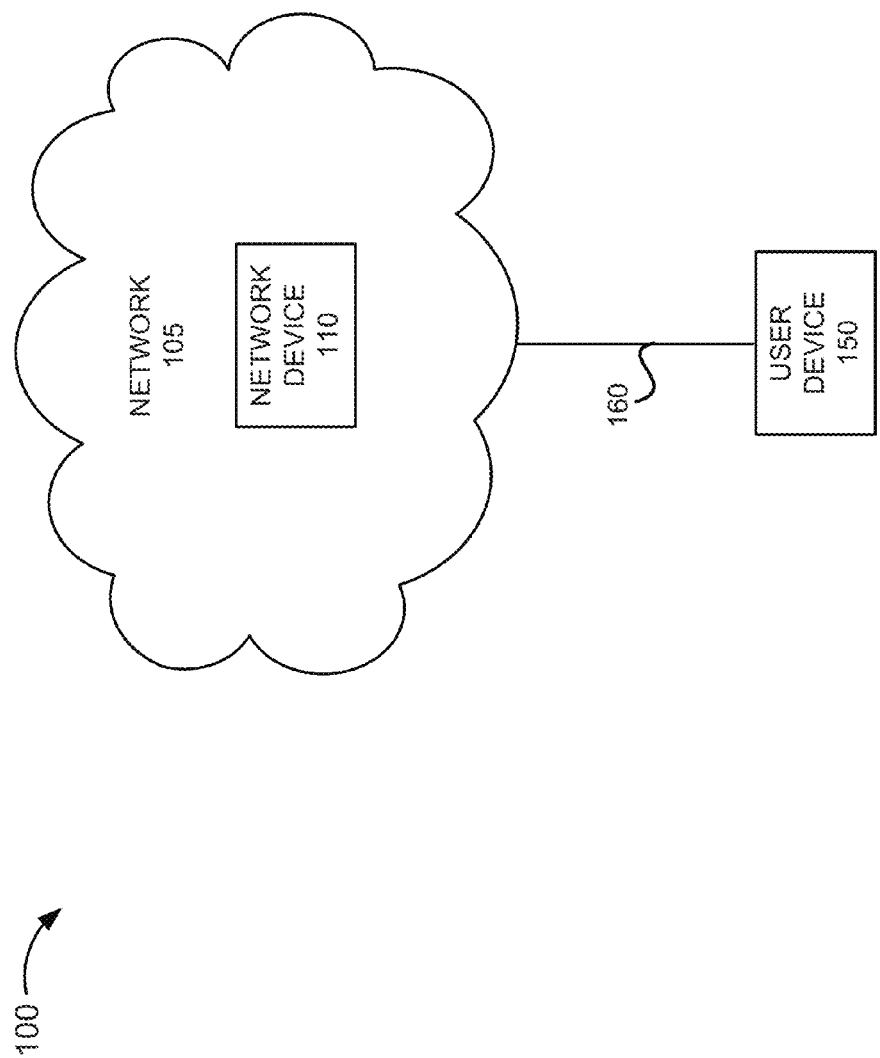
FIG. 1 is a diagram illustrating an exemplary environment in which an exemplary embodiment of a DVR service that includes a synchronization service may be implemented.

The following detailed description refers to the accompanying drawings. The same reference numbers in different drawings may identify the same or similar elements. Also, the following detailed description does not limit the invention.

A hybrid cloud-based DVR architecture that provides a DVR service may include a network device and a user device. The network device may manage the DVR service. For example, the network device may store recording information pertaining to recorded programs and programs scheduled to be recorded, as well as other information (e.g., metadata pertaining to the programs, etc.). The network device may also instruct or govern some operations performed by the user device. For example, the network device may communicate with the user device to cause the user device to record a program. The user device may store recorded programs, recording information, and other information. Additionally, the network device may communicate with the user device to cause the user device to play a recorded program, perform other trickplay features (e.g., pause, stop, rewind, fast-forward, etc.), and perform other services included in the DVR service.

Unfortunately, circumstances can arise that may negatively impact the DVR service. For example, when the recording information stored at the network device is different from the recording information stored at the user device, the DVR service may not operate correctly. For example, according to an exemplary scenario, the user device may send a request to record a program to the network device. In response, the network device sends a response that instructs the user device to record the program. However, in this example, the user device does not receive the response. Thus, the network device may store recording information pertaining to the program to be recorded, while the user device does not. As a result, there is a mismatch between the recording information stored at the network device and at the user device.

Typically, data synchronization strategies involve either an entire data dump from one device to another device or a delta of data changes are communicated from one device to another device. Also, the data synchronization strategy designates one device as having the most up-to-date or most reliable data (e.g., the master or the golden source) while the other device is the device to be updated and is not considered the master. However, in relation to data synchronization regarding, for example, recording information, determining which device (e.g., the network device or the user device) stores the most reliable recording information may be problematic. In this regard, a data synchronization service that merely uses an entire data dump or a delta of data change strategy would not yield the best results in support of the DVR service.

The term "program" as used herein, is intended to include a combination of audio data and visual data. For example, the program may be implemented as television content, Internet content, user content, or other form of audio/video media. By way of further example, the program may be a movie, a television show, a sports event, live content, pre-recorded content, premium channel content, pay-per-view content, a music event, a podcast, a videocast, a webcast, or a news event. The program may or may not include a commercial or an advertisement. Use of the term "program" in this description should also be interpreted based on context.

According to exemplary embodiments, a DVR service that includes a synchronization service is provided. According to an exemplary embodiment, a network element of a network and a user device each includes logic that provides the synchronization service. According to an exemplary embodiment, the synchronization service synchronizes information between the network element and the user device. According to an exemplary implementation, the synchronized information includes storage information and recording information. According to other exemplary implementations, the synchronized information may include additional, fewer, and/or different instances of information.

According to an exemplary embodiment, the network element compares recording information stored at and obtained from the user device to recording information stored at the network element. The network element determines whether a difference exists based on a result of the comparison. According to an exemplary embodiment, when no difference exists, the network element determines that the recording information is accurately synched (e.g., matching) with the recording information stored at the user device.

However, according to an exemplary embodiment, when the network element determines that a difference exists, the network element determines which recording information (or portion of the recording information) is the most reliable. That is, depending on the type of recording information, the value of the recording information, conditions and/or contexts, the network element selects the recording information stored at the network element or the recording information stored at the user device as the most reliable. According to an exemplary embodiment, based on such a determination, the network element updates the recording information at the network element or the user device with the most reliable recording information. As a result, the network element and the user device are synchronized in terms of storing the same recording information.

FIG. 1 is a diagram illustrating an exemplary environment 100 in which an exemplary embodiment of a DVR service that includes the synchronization service may be implemented. As illustrated, environment 100 includes a network 105. Network 105 includes network device 110. Additionally, environment 100 includes a user device 150. As further illustrated, environment 100 includes a communication link 160.

The number of network devices, the number of user devices, the number of networks, and the arrangement in environment 100 are exemplary. According to other embodiments, environment 100 may include additional network devices than that illustrated in FIG. 1. Additionally, or alternatively, environment 100 may include additional networks and an arrangement that are different from those illustrated in FIG. 1. For example, user device 150 may be a device of a local area network (LAN). Additionally, the number, the type (e.g., wired, wireless, etc.), and arrangement of communication link 160 illustrated in environment 100 are exemplary.

A network device may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

A communication connection between user device 150 and network device 110 may be direct or indirect via communication link 160. For example, an indirect communication connection may involve an intermediary network device, another user device, and/or an intermediary network not illustrated in FIG. 1.

Network 105 includes one or multiple networks of one or multiple types. Network 105 may be implemented as a satellite-based network, a terrestrial-based network, or a combination thereof. Network 105 may be implemented to include a television distribution network, a mobile network, a program streaming network, or other suitable network (e.g., the Internet, etc.) for providing programs. Network 105 may be implemented to provide programs using various technologies, such as an optical architecture, a coaxial cable architecture, an Internet Protocol (IP) TV architecture, a digital subscriber line (DSL) architecture, a wireless architecture, an Internet-based architecture, a program streaming architecture, or some combination thereof. Depending on the architecture implemented, network 105 may include super headend (SHE) devices, video hub office (VHO) devices, and video serving office (VSO) devices. Network 105 may include other types of devices, such as, for example, billing devices, security devices, customer profile devices, interactive programming guide devices, load balancer devices, and various types of program distribution devices (e.g., routers, gateway devices, repeater devices, splitter devices, passive optical network (PON) devices, etc.).

Network device 110 includes a communicative and computational device. Network device 110 may be implemented to include a network computer or the network computer and a mass storage device. Network device 110 includes logic that provides the synchronization service, as described herein.

According to an exemplary embodiment, network device 110 includes logic that stores and manages synchronization information that is to be synchronized (e.g., matched) between network device 110 and user device 150. According to an exemplary implementation, the synchronization information includes storage information and recording information. According to other exemplary implementations, the synchronization information includes additional, fewer, and/or different types of information.

According to an exemplary embodiment, network device 110 includes logic that compares the synchronization information stored at network device 110 with synchronization information stored at and obtained from user device 150. According to an exemplary embodiment, network device 110 includes logic that determines whether any differences exist between the synchronization information based on a result of the comparison. When no differences exist, network device 110 determines that network device 110 and user device 150 are synced (e.g., match) regarding the synchronization information. When a difference does exist, according to an exemplary embodiment, network device 110 includes logic to determine which device is to be used as the master. According to exemplary embodiments, network device 110 includes logic that selects the master based on the type of recording information, the value of the recording information, conditions, and/or contexts, as described herein. Network device 110 includes logic that updates the recording information at network device 110 or user device 150 according to the recording information associated with the selected master.

User device 150 includes a communicative and computational device. User device 150 may be implemented as a mobile device, a portable device, a stationary device, or a customer premise device. For example, user device 150 may be implemented to include a set top box (e.g., a client device, a converter box, a receiver, a tuner, a digibox, an IPTV set top box), a an in-home media server device, a mobile device (e.g., a smartphone, a tablet device, a netbook, a phablet, a personal digital assistant, etc.), an in-vehicle infotainment system, a computer (e.g., a desktop computer, a laptop computer, a DVR, etc.), or other type of end user device (e.g., a wearable device, an Internet access device, etc.). Additionally, for example, user device 150 may be implemented as a storage device, which in addition to storage for storing programs and other information (e.g., a hard drive, memory, etc.), includes logic that provides the synchronization service. The storage device may also include logic to play, record, etc., the programs stored on the storage device. User device 150 includes logic that provides the synchronization service, as described herein.

Communication link 160 provides a communication path between network 105 and user device 150, and between network device 110 and user device 150. Communication link 160 may have certain characteristics, such as, for example, bandwidth capacity and data rate. Communication link 160 may be implemented to include one or multiple mediums, such as wireless (e.g., radio, microwave, terrestrial, satellite, infrared, etc.) and/or wired (e.g., coaxial cable, optical fiber, copper, etc.).

Figure 2:
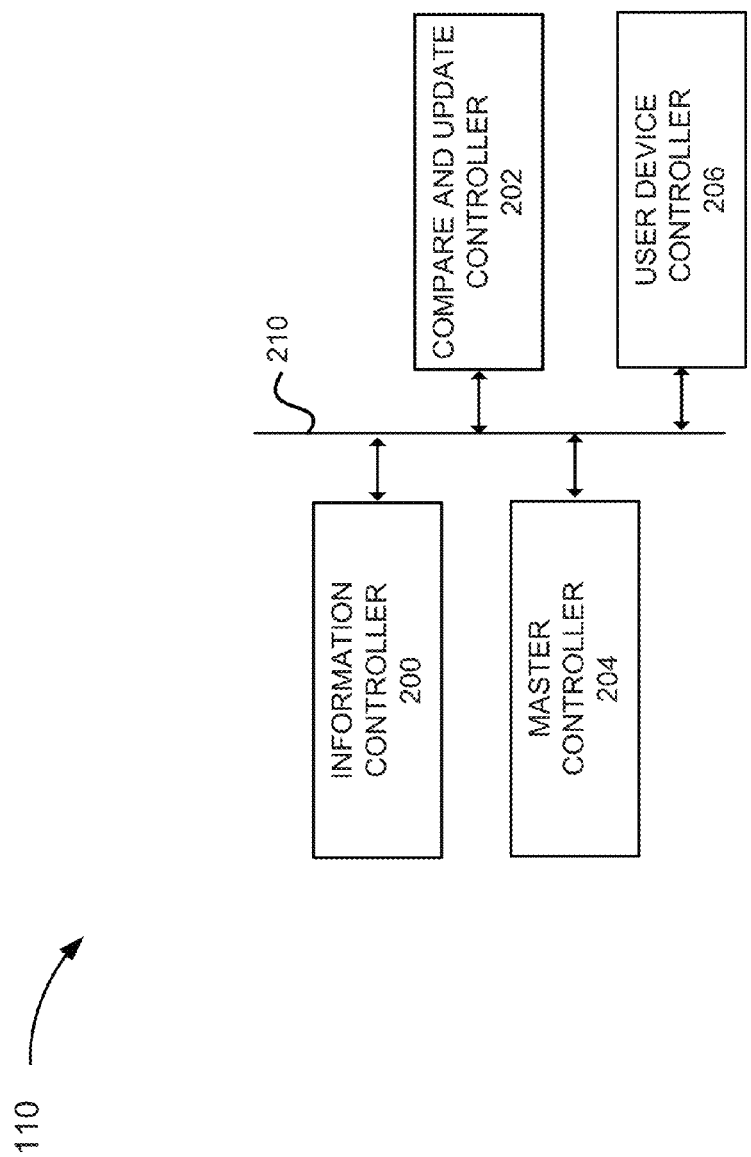
FIG. 2 is a diagram illustrating exemplary network elements of a network device that provide an exemplary embodiment of the synchronization service.

FIG. 2 is a diagram illustrating exemplary elements of an exemplary embodiment of network device 110. As illustrated, network device 110 includes an information controller 200, a compare and update controller 202, a master controller 204, a user device controller 206, and a link 210. According to other exemplary embodiments, network device 110 may include additional, fewer, and/or different elements than those illustrated in FIG. 2 and described herein. Additionally, multiple elements may be combined into a single element. Additionally, or alternatively, a single element may be implemented as multiple elements in which a process or a function may be collaboratively performed or multiple processes or functions may be split between them. According to various embodiments, one or more of the elements may operate on various planes of environment 100. For example, the various planes may include a data plane, a control plane, a management plane, and/or other planes implemented within environment 100. According to an exemplary embodiment, information controller 200, compare and update controller 202, master controller 204, and user device controller 206 include logic that support the synchronization service, as described herein.

Information controller 200 includes logic that manages and stores synchronization information. According to an exemplary implementation, the synchronization information includes storage information and recording information. According to an exemplary embodiment, information controller 200 includes a database management system (DBMS) that supports, among other things, a data model and a query language, and controls data access, data integrity, etc., relative to a database. The DBMS may be implemented using conventional, well-known, or commercially available relational or No Structured Query Language (NoSQL) software/packages (e.g., Microsoft SQL, Oracle Database, Cassandra, MongoDB, etc.). According to an exemplary implementation, the database may be implemented as a relational database or a hierarchical database model. Data or information of the database may be stored in various types of data structures (e.g., files, records, objects, tables, etc.). (e.g., user devices 140, network devices 110) and personnel (e.g., network administrators, users, etc.).

FIG. 3 is a diagram that illustrates exemplary types of synchronization information that may be stored in a table 300. As illustrated, table 300 includes storage information and recording information. According to an exemplary implementation, the storage information includes data that indicates storage details pertaining to a storage device used by the user device to store programs. For example, the storage information may include a total space field 305, a used space field 310, and a free space field 315. According to an exemplary implementation, the recording information includes data that indicates recording details pertaining to a program stored on the storage device or a program scheduled to be recorded and stored on the storage device used by the user device. For example, the recording information may include a recording identifier field 320, a recording hash field 325, an interval hash field 330, a recording size field 335, and a recording state 340. According to other exemplary implementations, the synchronization information may include additional, fewer, and/or different instances of data.

As further illustrated, table 300 includes profiles 350-1 through 350-X (also referred to as profiles 350 and, individually and generically as profile 350). Each profile 350 includes a grouping of data fields 305 through 340. Each profile 350 includes at least one instance of synchronization information that is different from another profile 350. For example, each profile 350 may pertain to a different user device 150. While table 300 illustrates a single instance of recording information (e.g., fields 320 through 340) for each profile 350, profile 350 may store multiple instances of recording information corresponding to multiple instances of recorded and/or scheduled programs. The values illustrated in table 300 are exemplary.

Total space field 305 stores data that indicates a total storage space of a storage device used by user device 150. For example, the storage device may have a total storage space of 1 Terabyte (TB), 2 TB s, etc. Used space field 310 stores data that indicates an amount of storage space used. Free space field 315 stores data that indicates an amount of unused storage space.

Recording identifier field 320 stores data that indicates a recording identifier. The recording identifier may be a unique identifier that identifies a recording session, a program to be recorded, or a recorded program.

Recording hash field 325 stores a hash value. For example, the recording hash may be calculated based on channel information associated with a program, a start time and an end time of recording, and a flag value that indicates whether the recording of the program stems from an explicit request from a user or an implicit request. According to other exemplary implementations, the recording hash may be calculated based on additional, fewer, and/or different types of data.

The channel information may indicate one or multiple instances of data. For example, the channel information may indicate a channel number (e.g., 899), a channel name (e.g., HBO, CBS, etc.), a channel sign (e.g., an icon or a logo associated with a channel), and/or a channel package identifier (e.g., basic, premier, sports, etc.). The channel information may also indicate other characteristics of the channel, such as level of definition (e.g., standard definition, high definition, 4K, etc.), type of channel, such as a digital channel (e.g., over-the-air, cable, a Quadrature Amplitude Modulation (QAM) channel, etc.), an on-line channel, an Internet Protocol (IP) television (IPTV) channel, or other type of attribute associated with the channel.

The start time and the end time may indicate a date and a timestamp for when the recording started and when the recording ended. The flag value may be represented by a single bit (e.g., 1 or 0) to indicate an explicit request or an implicit request. As an example, when the user initiates a recording (e.g., schedules a recording, presses a record button, etc.), such a circumstance indicates an explicit request to record a program. On the other hand, when the DVR service records a program to enable a trick play service, which may allow the user to, for example, pause, rewind, etc., a live broadcast of the program, such a circumstance indicates an implicit request. For the sake of description, examples other than those described herein, may be categorized as explicit or implicit depending on business rules, etc.

The value of the recording hash may change over time. For example, network device 110 may initially store a recording hash value when a program is scheduled to be recorded or upon receiving an unscheduled request to record a program. During the recording, the channel information, the end time, and/or the flag value may change depending on the user's behavior. In this regard, according an exemplary implementation, network device 110 may continually update the recording hash value during a recording session. According to other exemplary implementations, the user's behavior may cause network device 110 to generate another recording hash, in addition to the recording hash that was initially generated. According to an exemplary implementation, network device 110 calculates and stores the recording hash, which may be subsequently sent to user device 150.

Interval hash field 330 stores data that indicates a hash value. For example, the interval hash may be a value that indicates the intervals of a program that are recorded. For example, a one hour program may be divided into four intervals with each interval being fifteen minutes of the program. According to this example, before the recording begins (e.g., program is scheduled to be recorded), the interval hash may have a value of zero. When a first interval begins recording or after the first interval is completed recording, the interval hash may have a value of one, when the second interval begins recording or after the second interval is completed recording, the interval hash may have a value of two, and so forth. According to an exemplary implementation, user device 150 calculates and stores the interval hash, and subsequently sends the interval hash to network device 110.

Recording size field 335 stores data that indicates a size of a recorded program, a program to be recorded, or an amount of the program currently recorded. Recording state field 340 stores data that indicates a state pertaining to a recording of a program. According to an exemplary implementation, the recording state may indicate a scheduled state (e.g., a future schedule to record a program), a currently recording state (e.g., indicating that a program is currently being recorded), a recorded state (e.g., indicating that a program has been recorded), a deleted state (e.g., indicating that a program previously recorded has been deleted), and an erased state (e.g., indicating that a program previously recorded has been erased). The distinction between the deleted state and the erased state may be that a program in the deleted state can be recovered and subsequently played (e.g., upon request from a user), whereas a program in the erased state may not. According to other exemplary implementations, the recording state may indicate additional, fewer, and/or different states. For example, the recording state may indicate an error state. For example, an error may occur during the recording of the program due to a power outage. The error state may include data that indicates that the error occurred and/or a type of error (e.g., loss of power, device error (e.g., writing to the storage device, etc.)). Additionally, or alternatively, the recording state may indicate a missing state. The missing state may indicate a portion of the program (e.g., a slice, a chunk, etc.) or a packet is missing. For example, program data that was not received or contained errors that could not be corrected (e.g., by way of forward error correction) by the user device for recording may result in the recording of the program having a missing state. According to some implementations, the program may have multiple recording states (e.g., a recorded state and a missing state, etc.).

Additionally, or alternatively, the recording information may include other types of data. For example, the recording information may include metadata information. Metadata information may include information indicating characteristics of a program. By way of example, metadata information may include information indicating a title of a program, a genre of a program, a summary of the plot of a program, an actor starring in a program (e.g., lead, supporting), a crew member (e.g., director, producer, etc.), a year of a program, and/or other attributes of a program (e.g., movie picture rating, live program versus pre-recorded program, television series versus movie, length of program, etc.). According to an exemplary embodiment, despite a recorded program being deleted or erased, various types of metadata information may still be stored. For example, the metadata information may be used to maintain a user history associated with the DVR service. Additionally, or alternatively, although not illustrated in FIG. 3, synchronization information may include other types of information, such as a user device identifier, a user identifier, a subscription identifier, or other identifier that uniquely identifies the user device and/or the user to which profile 350 pertains.

Referring back to FIG. 2, compare and update controller 202 includes logic that compares synchronization information and determines whether a difference exists based on a result of the comparison. For example, network device 110 obtains synchronization information from user device 150. The synchronization information may correspond to information previously described in relation to profile 350. In response to obtaining the synchronization information, compare and update controller 202 selects a profile 350 that corresponds to user device 150 from which the synchronization information was obtained, and compares the obtained synchronization information with the synchronization information stored in the selected profile 350. When compare and update controller 202 determines that no difference exists, compare and update controller 202 determines that the synchronization information is synchronized. However, when compare and update controller 202 determines that a different exists relative to one or multiple data instances of the synchronization information, compare and update controller 202 includes logic that selects the appropriate update process, as described herein. According to an exemplary implementation, compare and update controller 202 selects the appropriate update process based on which data instances of the recording information match and/or do not match. According to an exemplary implementation, compare and update controller 202 selects the appropriate update process based on which of network device 110 or user device 150 is considered the master (i.e., the device that stores the most-reliable information). Compare and update controller 202 includes logic that performs the selected update process, which enables the synchronization of the synchronization information between network device 110 and user device 150.

Figure 4A:
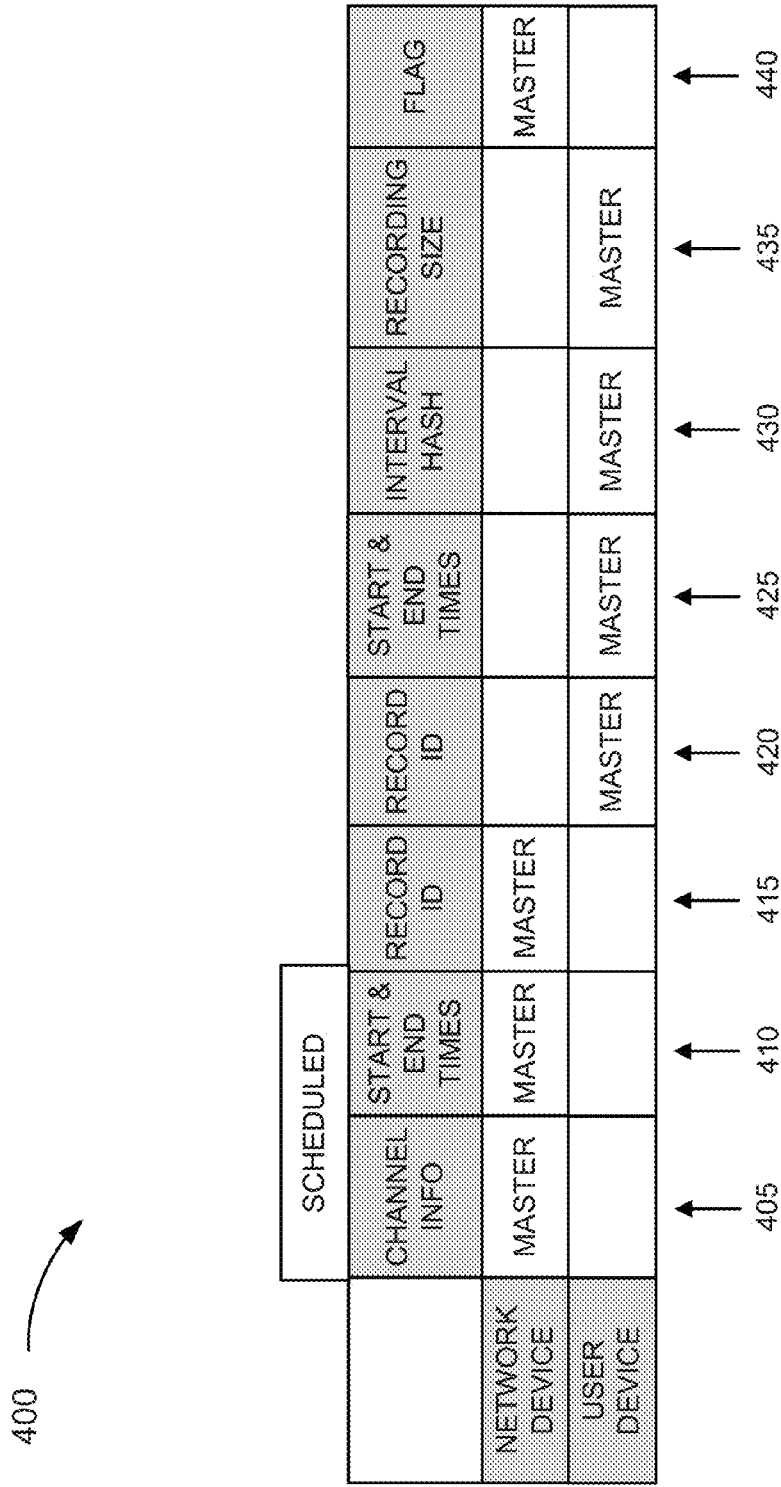
FIG. 4A is a diagram illustrating a table that stores exemplary master selection information pertaining to data instances of the synchronization information.
Figure 4B:
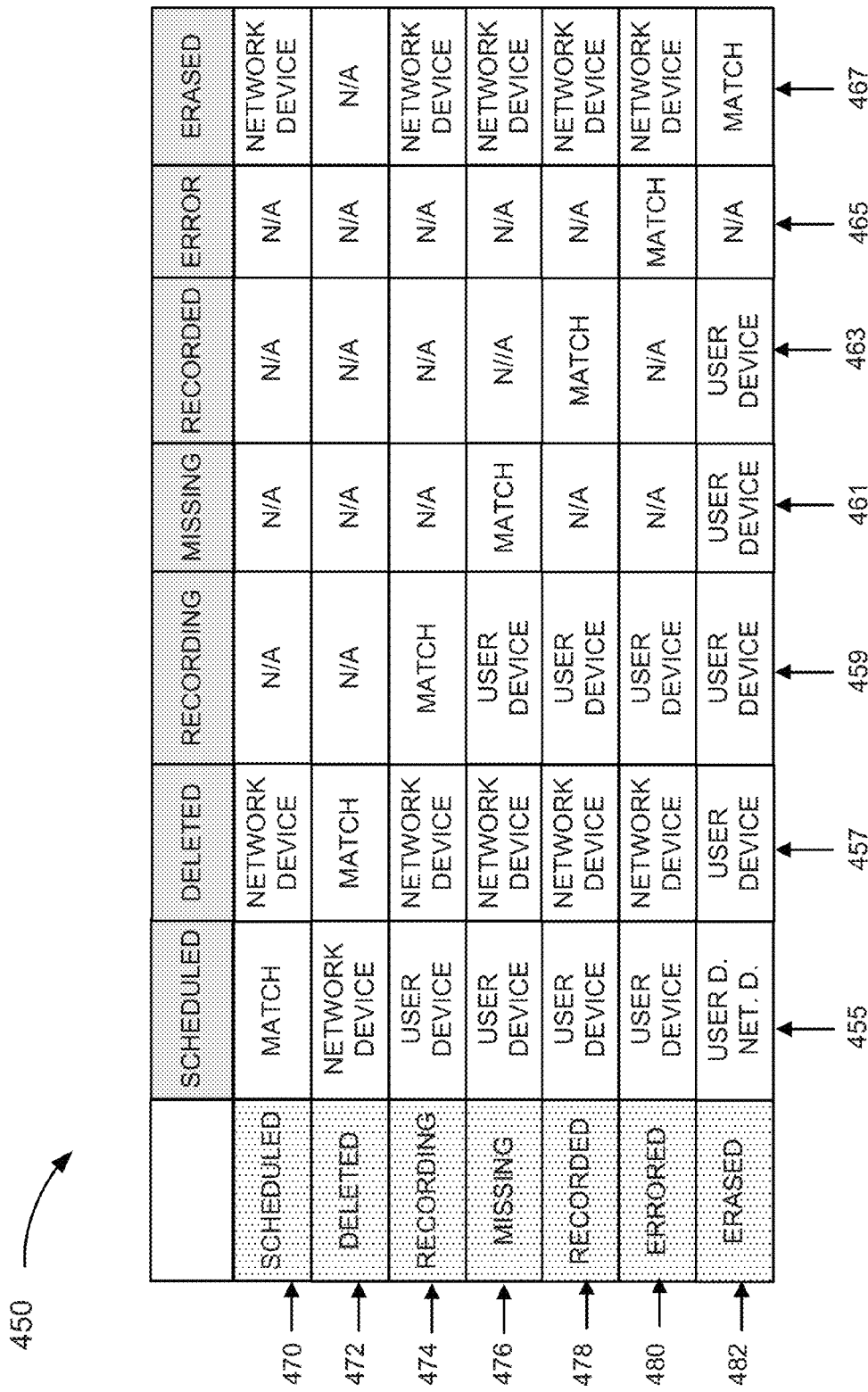
FIG. 4B is a diagram illustrating another table that stores exemplary master selection information pertaining to recording states of the synchronization information.

Master controller 204 includes logic that determines which of network device 110 or user device 150 is the master pertaining to a data instance of the synchronization information. FIGS. 4A and 4B are diagrams that illustrate exemplary tables that may be used by master controller 204 to determine which of network device 110 or user device 150 is the master. Referring to FIG. 4A, a table 400 is illustrated. Table 400 includes columns 405 through 440 in which each column relates to a particular data instance of the synchronization information. For example, column 405 relates to channel information, which is used to calculate the recording hash. Column 410 relates to the start and end times, which is also used to calculate the recording hash. As illustrated, however, columns 405 and 410 also relate to when the recording state is in a "scheduled" state (i.e., a future recording). Columns 415 and 420 each relates to a recording identifier, column 425 relates to start and end times, column 430 relates to interval hash, column 435 relates to recording size, and column 440 relates to the flag that indicates whether the recording of the program stems from an explicit request from the user or not.

As illustrated in FIG. 4A, in reference to columns 405 and 410, master controller 204 determines that for channel information and start and end time information, network device 110 is to be considered the master when the recording state is "scheduled." For example, during a time between the initial scheduling of a program to be recorded and the actual recording occurring, there may be a change in program schedule (e.g., channel, date and time, etc.). In this regard, network device 110 may have the more reliable information pertaining to the channel and start and end times of a program that is scheduled to be recorded. With reference to column 415, when the recording identifier is not stored at user device 150 but is stored at network device 110, and the recording end time is before the current time, network device 110 is considered the master. In this case, network device 110 updates user device 150 with the recording identifier and the recording state is updated to erased. According to another example, when the recording identifier is not stored at user device 150 but is stored at network device 110, and the recording end time is after the current time, network device 110 is considered the master. In this case, network device 110 updates user device 150 with the recording identifier.

With reference to column 420, when the recording identifier is stored at user device 150 but is not stored at network device 110, and the recording state stored at network device 110 is an erased state, user device 150 is the master. In this case, network device 110 updates the recording identifier to match the recording identifier stored by user device 150. Additionally, if the recording state stored at user device 150 does not match the recording state (i.e., erased) stored at network device 110, network device 110 updates the recording state stored at user device 150 to the erased state.

With reference to column 425, when the recording state is other than scheduled, user device 150 is considered the master. With reference to columns 430 and 435, user device 150 is considered the master in relation to the interval hash and the recording size. With reference to column 440 and the flag value (e.g., explicit or not), network device 110 is considered the master for all cases.

Referring to FIG. 4B, an exemplary table 450 is illustrated. According to this example, the columns (e.g., columns 455 through 467) represent different recording states stored at network device 110 and the rows (e.g., rows 470 through 472) represent different recording states stored at user device 150. As illustrated, table 450 includes entries in which the recording states match between network device 110 and user device 150. In particular, these circumstances are indicated at column 455, row 470 (scheduled state); column 457, row 472 (deleted state); column 459, row 474 (recording state); column 461, row 476 (missing state); column 463, row 478 (recorded state); column 465, row 480 (error state); and column 467, row 482 (erased state).

Also, as illustrated, table 450 includes entries that are indicated as not applicable ("N/A"). Stated differently, these entries relate to circumstances that could not occur. For example, with reference to column 459 and row 470, a circumstance in which network device 110 stores a recording state as recording while user device 150 stores a recording state as scheduled should not ever occur.

The remaining entries included in table 450 indicate when the recording states do not match and which of network device 110 or user device 150 is considered the master. For example, with reference to column 455 and row 472, when network device 110 stores a recording state of scheduled, and user device 150 stores a recording state of deleted, master controller 204 determines that network device 110 is the master. With reference to column 455 and row 482, the determination of which is the master may depend on the start and end times. For example, if the start and end times reflect a past recording (e.g., a past time period relative to the current time), then user device 150 is considered the master. Accordingly, master controller 204 will update the recording state stored at network device 110 to the erased state. If the start and end times reflect a time period in which the current time is within that time period, then master controller 204 will update the recording state on both network device 110 and user device 150 to a recording state. However, if the start and end times reflect a future recording (e.g., a future time period relative to the current time), then network device 110 is considered the master. Accordingly, master controller 204 will update the recording state stored at user device 150 to the scheduled state.

Referring back to FIG. 2, user device controller 206 includes logic that communicates with user device 150 to provide the synchronization service. For example, user device controller 206 may receive a synchronization message from user device 150. The synchronization message may include a request to synchronize the synchronization information between user device 150 and network device 110. The synchronization message may include storage information and recording information that is stored at user device 150. Additionally, for example, user device controller 206 may transmit a synchronization message to user device 150. For example, the synchronization message may include one or multiple data instances of recording information that is to be updated by user device 150. User device controller 206 may make available to another element of network device 110 (e.g., information controller 200, compare and update controller 202, etc.), the synchronization message received from user device 150. Also, another element of network device 110 may make available update information to user device controller 206 so that the updated synchronization information can be transmitted to user device 150.

Link 210 provides a communicative link between two or more elements. Link 210 may be implemented as a hardware link (e.g., a bus, a shared memory space, etc.), a software link (e.g., inter-process communication (IPC), etc.), or a combination thereof.

FIG. 5 is a diagram illustrating exemplary elements of an exemplary embodiment of user device 150. As illustrated, user device 150 includes an information controller 500, a synchronizer controller 502, and a link 510. According to other exemplary embodiments, user device 150 may include additional, fewer, and/or different elements than those illustrated in FIG. 5 and described herein. Additionally, multiple elements may be combined into a single element. Additionally, or alternatively, a single element may be implemented as multiple elements in which a process or a function may be collaboratively performed or multiple processes or functions may be split between them. According to various embodiments, one or more of the elements may operate on various planes of environment 100. For example, the various planes may include a data plane, a control plane, a management plane, and/or other planes implemented within environment 100. According to an exemplary embodiment, information controller 500, synchronizer controller 502, and network device controller 504 include logic that support the synchronization service, as described herein.

Information controller 500 includes logic that manages and stores synchronization information. According to an exemplary implementation, the synchronization information includes storage information and recording information. The synchronization information stored at user device 150 may correspond to a profile 350, as previously described in relation to FIG. 3, such as total space, used space, free space, recording identifier, recording hash, interval hash, recording size, and recording state. In contrast to network device 110, which may store hundreds, thousands, tens of thousands, etc., profiles 350, user device 150 may store significantly fewer profiles 350. For example, user device 150 may store only a single profile 350 associated with a user of the DVR service or multiple profiles 350 associated multiple users (e.g., different family members, etc.) of the DVR service. For the sake of brevity, the details of the synchronization information will not be repeated.

Synchronization controller 502 includes logic that causes user device 150 to generate and transmit synchronization messages to network device 110. For example, synchronization controller 502 may include logic that identifies an occurrence of a triggering event in which synchronization occurs between user device 150 and network device 110. According to an exemplary implementation, the triggering event includes when user device 150 is powered on by the user. Thereafter, synchronization controller 502 may operate according to a schedule, such as periodic synchronization (e.g., every 10 minutes, every hour, etc.). Additionally, or alternatively, synchronization controller 502 may operate aperiodically. For example, the user may invoke synchronization by entering an input, which includes a request to synchronize, via user device 150. Alternatively, for example, other types of user inputs or commands associated with the DVR service (e.g., an input to record a program, an input to delete a program, an input to erase a program, etc.), may constitute a triggering event.

Network device controller 504 includes logic that communicates with network device 110 to provide the synchronization service. For example, network device controller 504 may transmit a synchronization message to network device 110. The synchronization message may include a request to synchronize the synchronization information between user device 150 and network device 110. The synchronization message may include storage information and recording information that is stored at user device 150. Additionally, for example, network device controller 504 may receive a synchronization message from network device 110. For example, the synchronization message may include one or multiple data instances of recording information that is to be updated by user device 150. Network device controller 504 may make available to another element of user device 150 (e.g., information controller 500), the synchronization message received from network device 110. Conversely, another element of user device 150 may make available synchronization information to network device controller 504 so that the synchronization message can be transmitted from user device 150 to network device 110.

Link 510 provides a communicative link between two or more elements. Link 510 may be implemented as a hardware link (e.g., a bus, a shared memory space, etc.), a software link (e.g., inter-process communication (IPC), etc.), or a combination thereof.

Figure 6A:
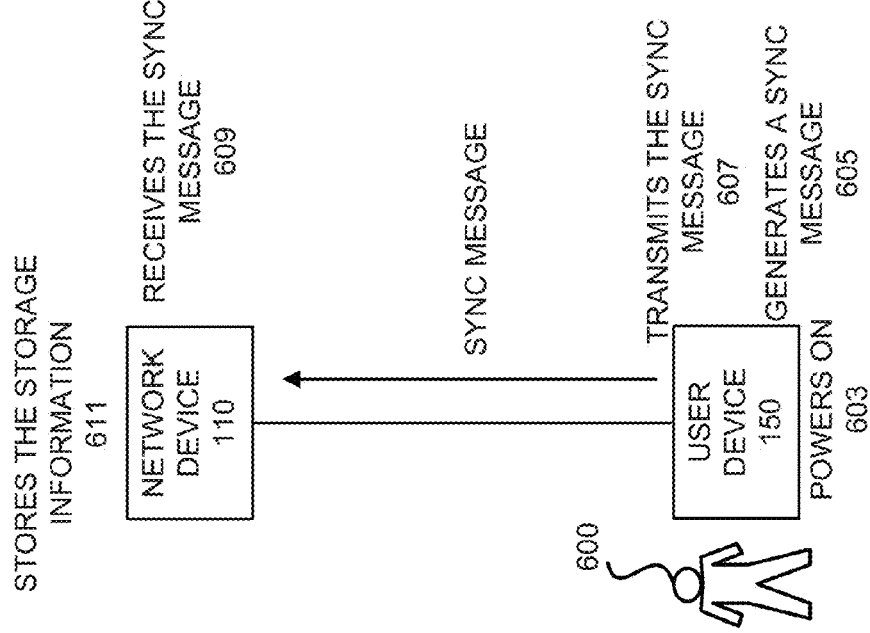
Figure 6B:
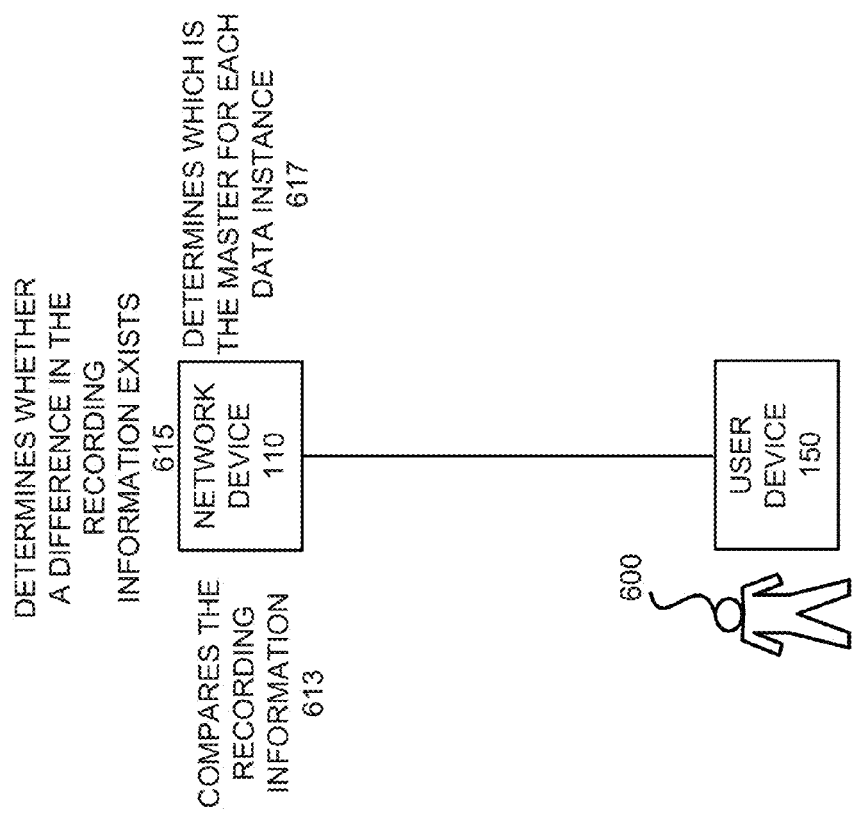

FIGS. 6A-6C are diagrams illustrating an exemplary process of the synchronization service. Referring to FIG. 6A, according to an exemplary scenario, assume that a user 600 powers on 603 user device 150. In response, synchronization controller 502 detects the powering up of user device 150 as a triggering event, which is communicated to network device controller 504. In response to the detection, network device controller 504 generates a synchronization message 605. The synchronization message may include synchronization information stored by information controller 500. For example, the synchronization information may include storage information and recording information. The synchronization message may also include a request to synchronize and other types of data (e.g., a user device identifier, a user identifier, etc.).

According to an exemplary implementation, the recording information may be implemented to include different lists. For example, one list may include recording information pertaining to future recordings (e.g., scheduled recordings of programs), and another list may include recording information pertaining to recorded programs (e.g., programs already recorded and stored at user device 150). The recorded programs may correspond to programs having the recording states of recorded, erred, missing and, erased, recording, and/or deleted. According to other exemplary implementations, the recording information may not be implemented to include different lists but includes a single list for all recording information. Alternatively, the recording information may be implemented to include one or multiple categories of lists based on one or multiple categories of recording states. Network device controller 504 transmits the synchronization message 607 to network device 110.

Network device 110 receives the synchronization message 609. In response, user device controller 206 identifies the storage information included in the synchronization message. In response to the identification, information controller 200 stores the storage information 611. For example, according to an exemplary implementation, user device 150 is considered the master for storage information. According to other exemplary implementations, compare and update controller 202 may compare the storage information stored at network device 110 with the storage information included in the synchronization message. When there is no difference, compare and update controller 202 may discard the storage information. However, when there is a difference, compare and update controller 202 may update the storage information stored at network device 110 with the storage information included in the synchronization message.

Referring to FIG. 6B, compare and update controller 202 may compare the recording information 613 stored at network device 110 with the storage information included in the synchronization information included in the synchronization message. In response to the comparison, compare and update controller 202 determines whether a difference in the recording information exists 615. According to this exemplary scenario, it may be assumed that a difference exists. In response to the determination that a difference exists, master controller 204 determines which of network device 110 or user device 150 is the master for each data instance 617.

Referring to FIG. 6C, according to this exemplary scenario, it may be assumed that for at least one data instance, master controller 204 determines that network device 110 is the master. In response to such a determination, user device controller 206 generates a synchronization message that includes update information 619. The update information includes the at least one data instance of the recording information in which network device 110 is the master. User device controller 206 transmits the synchronization message 621 to user device 150.

Network device controller 504 of user device 150 receives the synchronization message 623. In response to the receipt of the synchronization message, information controller 500 updates the recording information stored at user device 150 with the at least one data instance of the recording information.

While FIGS. 6A-6C illustrate an exemplary process of the synchronization service, according to other exemplary scenarios, additional, fewer, and/or different operations may be performed. For example, when network device 110 determines that no difference exists between the recording information received from user device 150 and the recording information stored by network device 110, network device 110 may or may not simply transmit an acknowledgement message or a synchronization message that indicates that the recording information are synced. Alternatively, for example, when network device 110 determines that a difference exists, but that user device 150 is the master, network device 110 may update the recording information stored at network device 110.

FIG. 7 is a diagram illustrating exemplary components of a device 700 that may correspond to one or more of the devices described herein. For example, device 700 may correspond to components included in network device 110 and user device 150. Additionally, the exemplary network elements of network device 110 (e.g., information controller 200, compare and update controller 202, master controller 204, and user device controller 206) may be implemented based on the components described. Further, the exemplary elements of user device 150 may be implemented based on the components described.

As illustrated in FIG. 7, according to an exemplary embodiment, device 700 includes a bus 705, a processor 710, a memory/storage 715 that stores software 720, a communication interface 725, an input 730, and an output 735. According to other embodiments, device 700 may include fewer components, additional components, different components, and/or a different arrangement of components than those illustrated in FIG. 7 and described herein.

Bus 705 includes a path that permits communication among the components of device 700. For example, bus 705 may include a system bus, an address bus, a data bus, and/or a control bus. Bus 705 may also include bus drivers, bus arbiters, bus interfaces, and/or clocks.

Processor 710 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 710 may be implemented as hardware (e.g., a microprocessor, etc.), a combination of hardware and software (e.g., a SoC, an ASIC, etc.), may include one or multiple memories (e.g., cache, etc.), etc. Processor 710 may be a dedicated component or a non-dedicated component (e.g., a shared resource).

Processor 710 may control the overall operation or a portion of operation(s) performed by device 700. Processor 710 may perform one or multiple operations based on an operating system and/or various applications or computer programs (e.g., software 720). Processor 710 may access instructions from memory/storage 715, from other components of device 700, and/or from a source external to device 700 (e.g., a network, another device, etc.). Processor 710 may perform an operation and/or a process based on various techniques including, for example, multithreading, parallel processing, pipelining, interleaving, etc.

Memory/storage 715 includes one or multiple memories and/or one or multiple other types of storage mediums. For example, memory/storage 715 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 715 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 715 may include a drive for reading from and writing to the storage medium.

Memory/storage 715 may be external to and/or removable from device 700, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 715 may store data, software, and/or instructions related to the operation of device 700.

Software 720 includes an application or a program that provides a function and/or a process. Software 720 may include an operating system. Software 720 may also include firmware, middleware, microcode, hardware description language (HDL), and/or other form of instruction. By way of example, with respect to network devices 110 and the network elements, the logic that provides the multicast service may be implemented to include software 720. Additionally, for example, user device 150 may include logic to perform tasks, as described herein, based on software 720.

Communication interface 725 permits device 700 to communicate with other devices, networks, systems, devices, and/or the like. Communication interface 725 includes one or multiple wireless interfaces and/or wired interfaces. For example, communication interface 725 may include one or multiple transmitters and receivers, or transceivers. Communication interface 725 may include an antenna. Communication interface 725 may operate according to a protocol stack and a communication standard. Communication interface 725 may include various processing logic or circuitry (e.g., multiplexing/de-multiplexing, filtering, amplifying, converting, error correction, etc.).

Input 730 permits an input into device 700. For example, input 730 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 735 permits an output from device 700. For example, output 735 may include a speaker, a display, a light, an output port, and/or some other type of visual, auditory, tactile, etc., output component. According to some embodiments, input 730 and/or output 735 may be a device that is attachable to and removable from device 700.

Device 700 may perform a process and/or a function, as described herein, in response to processor 710 executing software 720 stored by memory/storage 715. By way of example, instructions may be read into memory/storage 715 from another memory/storage 715 (not shown) or read from another device (not shown) via communication interface 725. The instructions stored by memory/storage 715 cause processor 710 to perform a process described herein. Alternatively, for example, according to other implementations, device 700 performs a process described herein based on the execution of hardware (processor 710, etc.).

Figure 8:
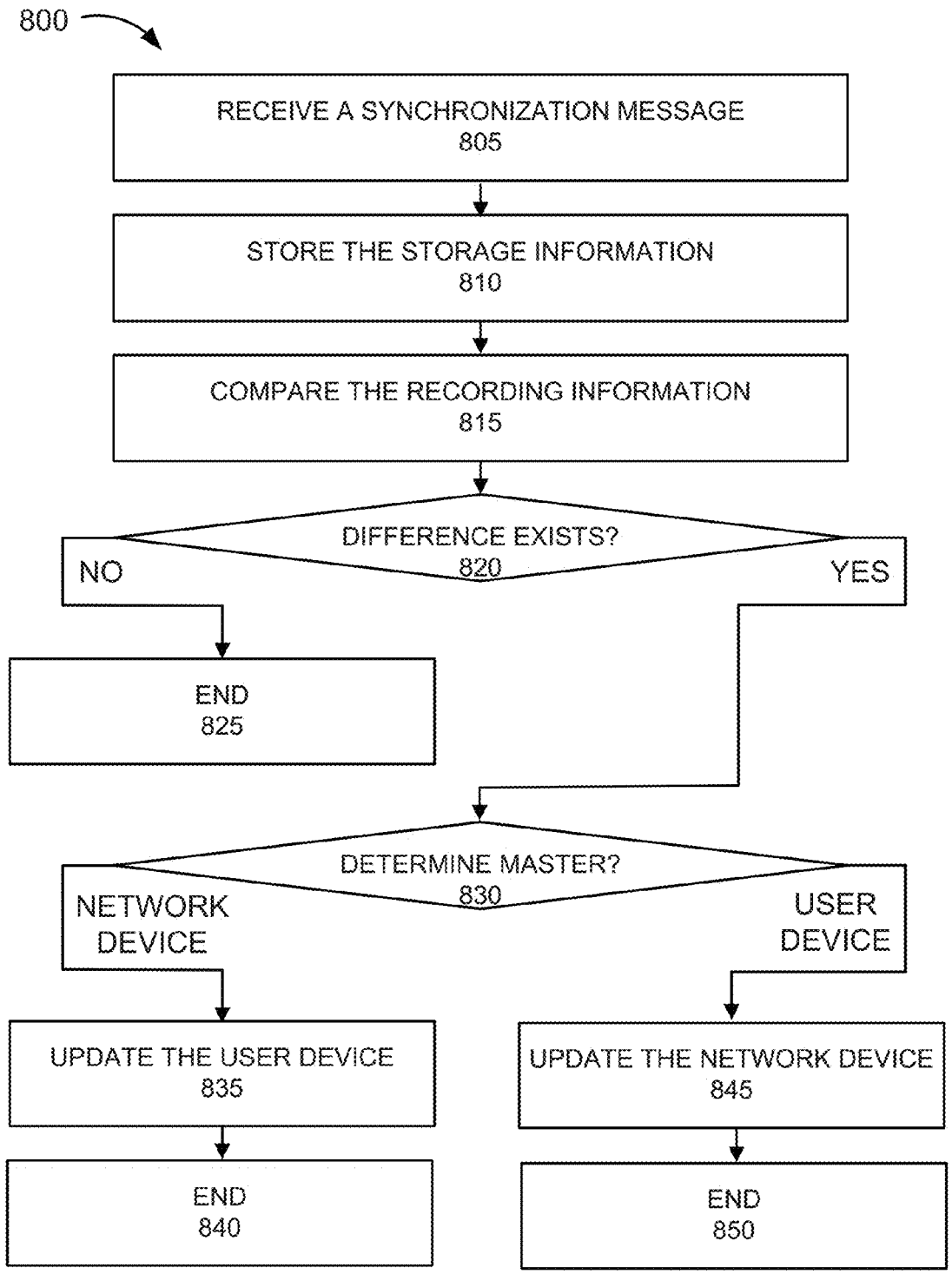
FIG. 8 is a flow diagram illustrating an exemplary process of the synchronization service.

FIG. 8 is a flow diagram illustrating an exemplary process 800 pertaining to the synchronization service. Process 800 is directed to a previously described with respect to FIGS. 6A-6C and elsewhere in this detailed description pertaining to the synchronization service. According to an exemplary embodiment, network device 110 performs the steps of process 800. For example, processor 710 executes software 720 to perform the steps described.

Referring to FIG. 8, in block 805, process 800 may begin with receiving a synchronization message. For example, network device 110 receives the synchronization message from user device 150. According to an exemplary implementation, the synchronization information includes recording information and storage information.

In block 810, the storage information is stored. For example, network device 110 selects the storage information. Network device 110 stores the storage information in table 300.

In block 815, the recording information is compared. For example, network device 110 compares each data instance of the recording information included in the synchronization message with a corresponding data instance of the recording information stored by network device 110 in table 300.

In block 820, it is determined whether a difference exists. For example, based on a result of the comparison, network device 110 determines whether a type of data (e.g., recording identifier, recording hash, etc.) and the value of the type of data differ.

When it is determined that no difference exists (block 820—NO), process 800 may end (block 825). For example, network device 110 may determine that the recording information is in sync between network device 110 and user device. Network device 110 may generate and transmit a synchronization message, which indicates that the recording information is in sync, to user device 150

When it is determined that a difference exists (block 820—YES), it is determined which device is the master (block 830). For example, for each data instance of the recording information that differs, network device 110 determines which of network device 110 or user device 150 is the master.

When it is determined that the network device is the master (block 830—Network device), the user device is updated (block 835). For example, for each data instance in which network device 110 is considered the master, network device 110 updates user device 150. For example, network device 110 generates and transmits a synchronization message to user device 150. The synchronization message includes the updated recording information that matches the recording information stored at network device 110. Thereafter, the DVR service may be provided to the user of user device 150 based on the synchronized recording information. For example, programs that are recorded may be played and scheduled program may be properly recorded. In block 840, the process ends. For example, network device 110 may receive an acknowledgement from user device 150 that the updated recording information has been received and that user device 150 has updated the recording information stored at user device 150.

When it is determined that the user device is the master (block 830—User device), the network device is updated (block 845). For example, for each data instance in which user device 150 is considered the master, network device 110 updates the recording information stored at network device 110. Thereafter, the DVR service may be provided to the user of user device 150 based on the synchronized recording information. For example, programs that are recorded may be played and scheduled program may be properly recorded. In block 850, the process ends.

Although FIG. 8 illustrates an exemplary process performed by network device 110, according to other embodiments, process 800 may include additional operations, fewer operations, and/or different operations than those illustrated in FIG. 8, and as described herein.

Figure 9A:
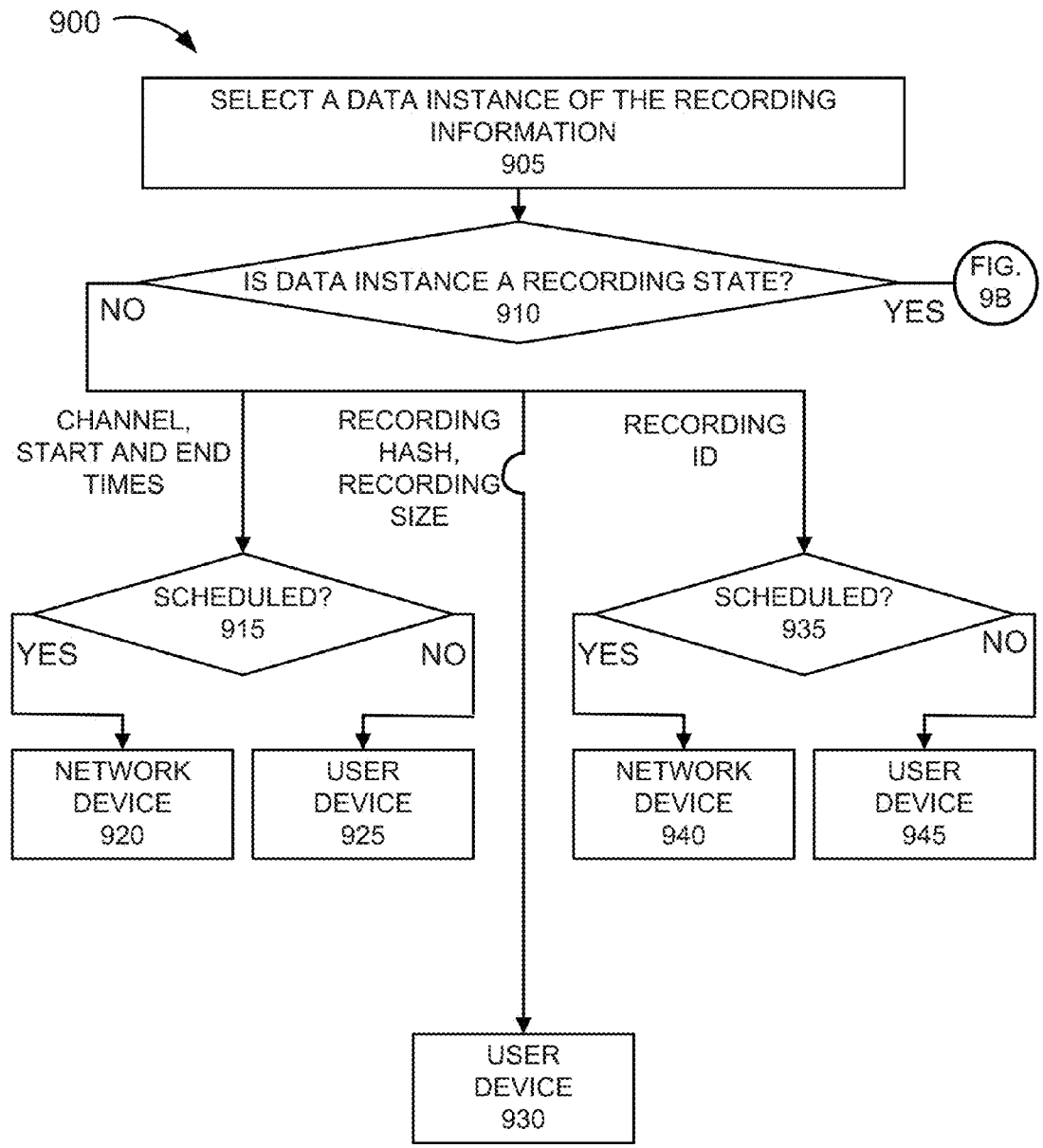
FIGS. 9A-9C are flow diagrams illustrating another exemplary process of the synchronization service.
Figure 9B:
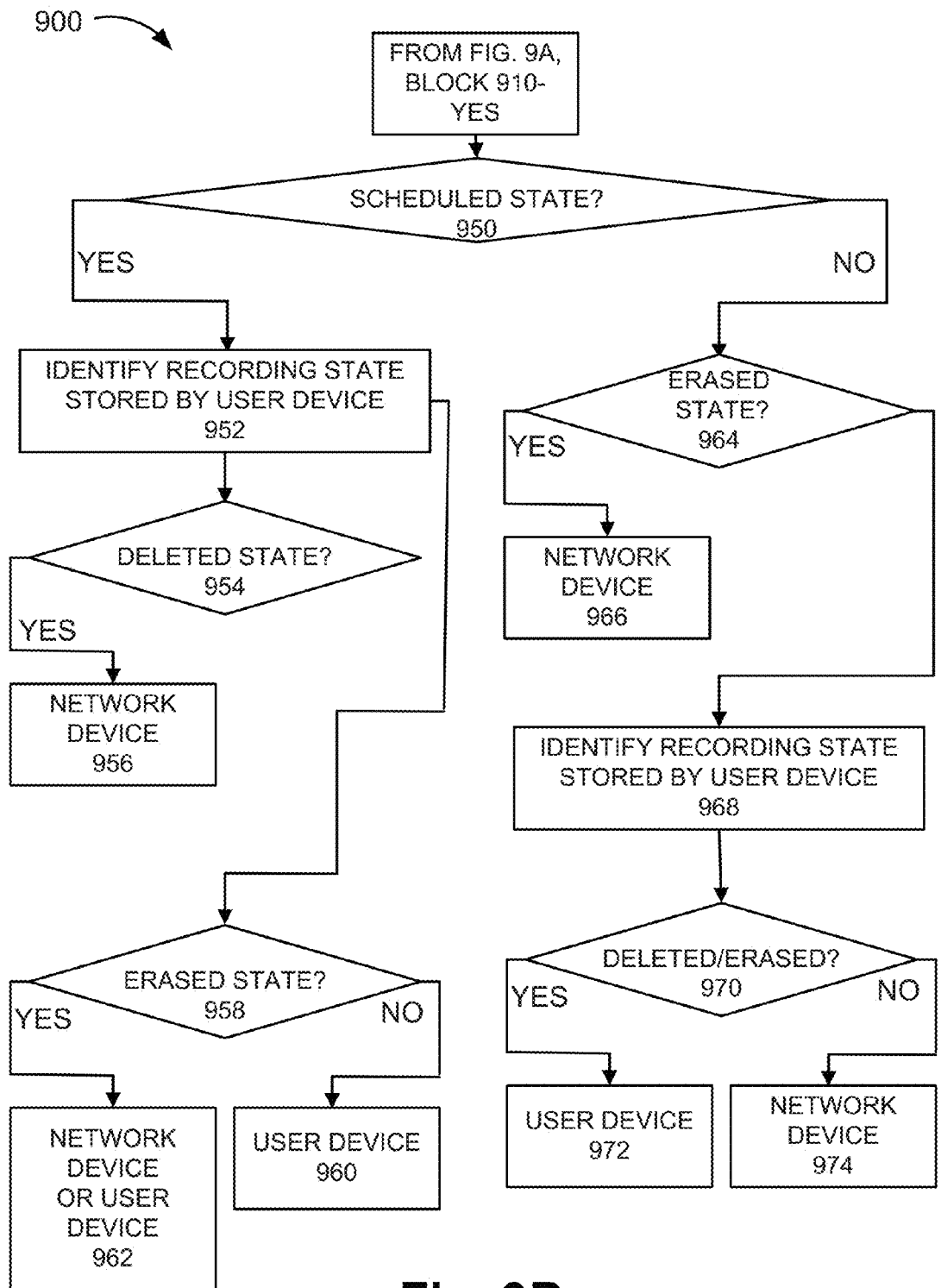
Figure 9C:
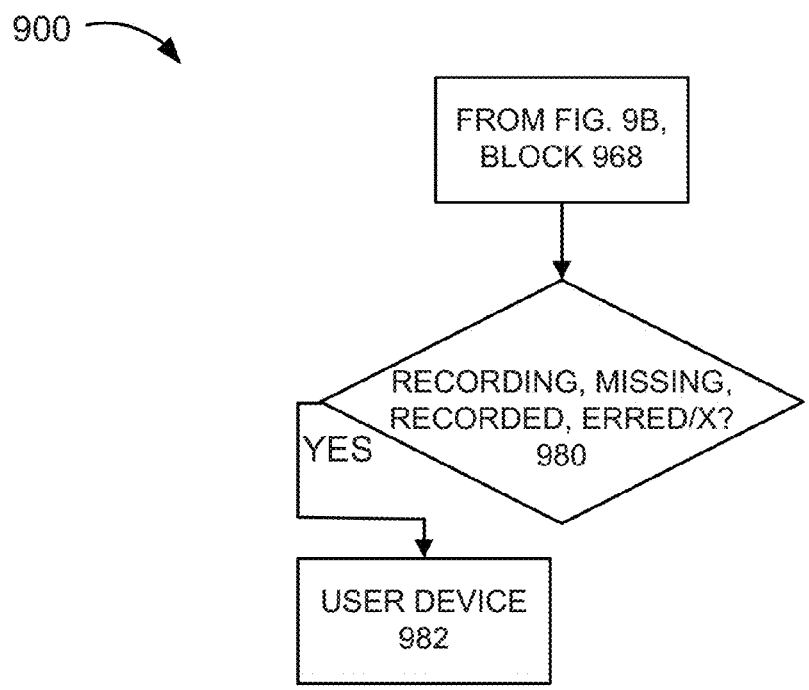

FIGS. 9A-9C are flow diagrams illustrating another exemplary process 900 pertaining to the synchronization service. Process 900 is directed to a process previously described with respect to FIGS. 4A and 4B as well as elsewhere in this detailed description. According to an exemplary embodiment, network device 110 performs the steps described. For example, processor 710 executes software 720 to perform the steps described. Process 900 may be implemented at block 830 of FIG. 8.

Referring to FIG. 9A, in block 905, a data instance of the recording information is selected. For example, network device 110 selects a data instance stored at network device for comparison. In block 910, it is determined whether the data instance indicates a recording state. When it is determined that the data instance does not indicate a recording state (block 910—NO), then depending on the data instance selected, network device 110 determines which of network device 110 or user device 150 is the master, as illustrated. For example, when the data instance is channel information, or start and end times, in block 915, network device 110 determines whether the recording state associated with the program is a schedule state. Additionally, or alternatively, network device 110 may use the start and end times of the program relative to the current time. When it is determined that it is a scheduled state (block 915—YES), then the network device is the master (block 920) and when it is not, then the user device is the master (block 925). When the data instance is one of the recording hash or the recording size, then network device 110 determines that the user device is the master (block 930). When the data instance is a recording identifier, then it is determined whether the recording state associated with the program is a scheduled state (block 935). For example, when the recording identifier is not stored at user device 150 but is stored at network device 110, and the recording end time is before the current time (block 935—YES), network device 110 is considered the master (block 940). When the recording identifier is not stored at user device 150 but is stored at network device 110, and the recording end time is after the current time (block 935—NO), network device 110 is considered the master (block 945).

Although not illustrated in FIG. 9A, as previously described, when the recording identifier is stored at user device 150 but is not stored at network device 110, and the recording state stored at network device 110 is an erased state, user device 150 is the master. In this case, network device 110 updates the recording identifier to match the recording identifier stored by user device 150. Additionally, if the recording state stored at user device 150 does not match the recording state (i.e., erased) stored at network device 110, network device 110 updates the recording state stored at user device 150 to the erased state.

Referring to FIG. 9A, when it is determined that the data instance is a recording state (block 910—YES), then it is determined whether the recording state stored at the network device is a scheduled state (FIG. 9B, block 950). When it is determined that the recording state stored at the network device is a scheduled state (block 950—YES), then the recording state stored at the user device is identified (block 952). For example, network device 110 determines the recording state pair (e.g., the recording state stored at network device 110 and the recording state carried in the synchronization message received from user device 150). For blocks 954, 956, 958, 960, and 962, network device 110 selects the master in correspondence to table 400. For example, in block 954, it is determined whether the recording state stored at the user device is the deleted state, and if so, network device 110 selects network device 110 as the master (block 956). Additionally, for example, in block 958, it is determined whether the recording state stored at the user device is the erased state, and if not, network device 110 selects user device 150 as the master (block 960). However, if so, then depending on the recording state of the user device, network device 110 may select network device 110 or user device 150, as previously described.

Referring back to block 950, when it is determined that the recording state is not a scheduled state (block 950—NO), then it is determined whether the recording state stored at the network device is an erased state (block 964). When it is determined that the recording state stored at the network device is the erased state (block 964—YES), then regardless of the recording state stored at the user device, network device 110 selects network device 110 as the master (block 966).

When it is determined that the recording state is not the erased state (block 964—NO), then the recording state of the user device is identified (block 968). For blocks 970, 972, and 974 of FIG. 9B, and blocks 980 and 982 of FIG. 9C, network device 110 selects the master in correspondence to table 450. For example, in block 970, it is determined whether the network device/user device recording state pair is deleted/erased. When the recording state pair is deleted/erased (block 970—YES), network device 110 selects user device 150 as the master (block 972), and when network device 110 stores a deleted state and user device 150 stores a recording state other than erased (block 970), network device 110 selects network device 110 as the master (block 974). Additionally, in block 980 of FIG. 9C, when the recording state stored at network device 110 is one of recording, missing, recorded, or erred, then regardless of the recording state stored at the user device, network device 110 selects user device 150 as the master (block 982).

Although FIGS. 9A-9C illustrates an exemplary process pertaining to the synchronization service, according to other embodiments, process 900 may include additional operations, fewer operations, and/or different operations than those illustrated in FIGS. 9A-9C, and as described herein.

The foregoing description of embodiments provides illustration, but is not intended to be exhaustive or to limit the embodiments to the precise form disclosed. Accordingly, modifications to the embodiments described herein may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The term "exemplary," as used herein means "serving as an example." Any embodiment or implementation described as "exemplary" is not necessarily to be construed as preferred or advantageous over other embodiments or implementations.

In addition, while series of blocks have been described with regard to the processes illustrated in FIGS. 8 and 9A-9C, the order of the blocks may be modified according to other embodiments. Further, non-dependent blocks may be performed in parallel or simultaneously. For example, according to an exemplary implementation, two or more operations may be performed using parallel processing or a multitasking procedure. Additionally, other processes described in this description may be modified and/or non-dependent operations may be performed in parallel or simultaneously.

The embodiments described herein may be implemented in many different forms of software executed by hardware. For example, a process or a function may be implemented as "logic" or as a "component." The logic or the component may include, for example, hardware (e.g., processor 710), or a combination of hardware and software (e.g., processor 710 and software 720). The embodiments have been described without reference to the specific software code since the software code can be designed to implement the embodiments based on the description herein and commercially available software design environments/languages.

In the description and illustrated by the drawings, reference is made to "an exemplary embodiment," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

Additionally, embodiments described herein may be implemented as a non-transitory storage medium that stores data and/or information, such as instructions, program code, a computer program, software, a software application, a data structure, a program module, an application, machine code, a file that can be executed using an interpreter, etc. The program code, instructions, application, etc., is readable and executable by a processor (e.g., processor 710) of a computational device. A non-transitory storage medium includes one or more of the storage mediums described in relation to memory/storage 715.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction described in the description or illustrated in the drawings should be construed as critical or essential to the embodiments described herein unless explicitly described as such.

What is claimed is:

1. A method comprising:

storing, by a network device, first recording information that indicates programs that are recorded and stored at user devices, and programs to be recorded and stored at the user devices, wherein the network device uses the first recording information to provide a digital video recorder (DVR) service to the user devices, and wherein the first recording information pertaining to each user device includes first data instances;

receiving, by the network device and from one of the user devices, a message that includes second recording information that indicates one or more programs that are recorded and stored at the one of the user devices, scheduled to be recorded and stored at the one of the user devices, or both, wherein the second recording information includes second data instances;

comparing, by the network device and in response to the receiving, a portion of the first recording information that pertains to the one of the user devices with the second recording information;

determining, by the network device, whether there is a difference between each first data instance relative to each corresponding second data instance;

determining, by the network device and in response to determining that there is the difference, a master source for each first data instance that differs from each corresponding second data instance, wherein the master source indicates which of the network device or the one of the user devices stores a most reliable data, and wherein determining the master source includes determining whether one of the first data instances indicates a recording state of one of the programs, and wherein when determining that the one of the first data instances does not indicate the recording state of the one of the programs, the method further comprises:

determining, by the network device, whether the one of the programs associated with the one of the first data instances has the recording state that indicates the one of the programs is scheduled to be recorded;

updating, by the network device and in response to determining the master source for each first data instance that differs, one of the network device or the one of the user devices based on the master source, wherein when the network device is the master source, the one of the user devices is updated with a differing first data instance, and when the one of the user devices is the master source, the network device is updated with a differing second data instance; and providing, by the network device and in response to the updating, the DVR service based on an updated portion of the first recording information stored at the network device, an updated second recording information stored at the one of the user devices, or both.

2. The method of claim 1, wherein when the one of the user devices is updated with the differing first data instance, the method further comprises:

transmitting, by the network device and to the one of the user devices, the differing first data instance;

receiving, by the one of the user devices, the differing first data instance; and storing, by the one of the user devices, the differing first data instance to create the updated second recording information.

3. The method of claim 1, wherein when the network device is updated with the differing second data instance, the method further comprises:

storing, by the network device, the differing second data instance to create the updated portion of the first recording information.

4. The method of claim 1, wherein the second recording information includes information indicating a recording identifier, a recording hash, and a recording state.

5. The method of claim 1, wherein when determining that the one of the programs has the recording state that indicates the one of the programs is scheduled to be recorded, the method further comprising:

determining, by the network device, that the master source for the one of the first data instances is the network device.

6. The method of claim 1, wherein when determining that the one of the programs has the recording state that indicates the one of the programs is not scheduled to be recorded, the method further comprising:

determining, by the network device, that the master source for the one of the first data instances is the one of the user devices.

7. The method of claim 1, wherein when determining that the one of the first data instances does indicate the recording state of the one of the programs, the method further comprises:

identifying, by the network device, a recording state indicated by a corresponding one of the second data instances;

comparing, by the network device, the recording state indicated by the one of the first data instances with the recording state indicated by the corresponding one of the second data instances; and determining, by the network device, the master source based on the comparing of the recording state indicated by the one of the first data instances with the recording state indicated by the corresponding one of the second data instances.

8. The method of claim 1, wherein when determining that the one of the first data instances does indicate the recording state of the one of the programs, the method further comprises:

identifying, by the network device, a recording state indicated by a corresponding one of the second data instances;

comparing, by the network device, the recording state indicated by the one of the first data instances with the recording state indicated by the corresponding one of the second data instances, wherein the recording state indicated by the one of the first data instances indicates that the one of the programs is scheduled to be recorded, and the recording state indicated by the corresponding one of the second data instances indicates that the one of the programs is erased; and selecting, by the network device, the network device as the master source based on the comparing of the recording state indicated by the one of the first data instances with the recording state indicated by the corresponding one of the second data instances.

9. A network device comprising:

a communication interface;

a memory, wherein the memory stores software;

a processor, wherein the processor executes the software to:

store first recording information that indicates programs that are recorded and stored at user devices, and programs to be recorded and stored at the user devices, wherein the network device uses the first recording information to provide a digital video recorder (DVR) service to the user devices, and wherein the first recording information pertaining to each user device includes first data instances;

receive, via the communication interface and from one of the user devices, a message that includes second recording information that indicates one or more programs that are recorded and stored at the one of the user devices, scheduled to be recorded and stored at the one of the user devices, or both, wherein the second recording information includes second data instances;

compare in response to the receipt of the message, a portion of the first recording information that pertains to the one of the user devices with the second recording information;

determine whether there is a difference between each first data instance relative to each corresponding second data instance;

determine, in response to a determination that there is the difference, a master source for each first data instance that differs from each corresponding second data instance, wherein the master source indicates which of the network device or the one of the user devices stores a most reliable data, and wherein determining the master source includes determining whether one of the first data instances indicates a recording state of one of the programs, and wherein when determining that the one of the first data instances does not indicate the recording state of the one of the programs, the processor further executes the software to:
determine whether the one of the programs associated with the one of the first data instances has the recording state that indicates the one of the programs is scheduled to be recorded;

update, in response to the determination of the master source for each first data instance that differs, one of the network device or the one of the user devices based on the master source, wherein when the network device is the master source, the one of the user devices is updated with a differing first data instance, and when the one of the user devices is the master source, the network device is updated with a differing second data instance; and provide, in response to the update, the DVR service based on an updated portion of the first recording information stored at the network device, an updated second recording information stored at the one of the user devices, or both.

10. The network device of claim 9, wherein when the one of the user devices is updated with the differing first data instance, the processor further executes the software to:
transmit, via the communication interface and to the one of the user devices, the differing first data instance.

11. The network device of claim 9, wherein when the network device is updated with the differing second data instance, the processor further executes the software to:
store the differing second data instance to create the updated portion of the first recording information.

12. The network device of claim 9, wherein the second recording information includes information indicating a recording identifier, a recording hash, and a recording state.

13. The network device of claim 9, wherein when determining that the one of the programs has the recording state that indicates the one of the programs is scheduled to be recorded, the processor further executes the software to:
determine that the master source for the one of the first data instances is the network device.

14. The network device of claim 9, wherein when determining that the one of the programs has the recording state that indicates the one of the programs is not scheduled to be recorded, the processor further executes the software to:
determine that the master source for the one of the first data instances is the one of the user devices.

15. The network device of claim 9, wherein when determining that the one of the first data instances does indicate the recording state of the one of the programs, the processor further executes the software to:
identify a recording state indicated by a corresponding one of the second data instances;
compare the recording state indicated by the one of the first data instances with the recording state indicated by the corresponding one of the second data instances; and
determine the master source based on the comparison of the recording state indicated by the one of the first data instances with the recording state indicated by the corresponding one of the second data instances.

16. A non-transitory computer-readable storage medium that stores instructions executable by a processor of a network device, which when executed cause the network device to:
store first recording information that indicates programs that are recorded and stored at user devices, and programs to be recorded and stored at the user devices, wherein the network device uses the first recording information to provide a digital video recorder (DVR) service to the user devices, and wherein the first recording information pertaining to each user device includes first data instances;

receive, from one of the user devices, a message that includes second recording information that indicates one or more programs that are recorded and stored at the one of the user devices, scheduled to be recorded and stored at the one of the user devices, or both, wherein the second recording information includes second data instances;

compare in response to the receipt of the message, a portion of the first recording information that pertains to the one of the user devices with the second recording information;

determine whether there is a difference between each first data instance relative to each corresponding second data instance;

determine, in response to a determination that there is the difference, a master source for each first data instance that differs from each corresponding second data instance, wherein the master source indicates which of the network device or the one of the user devices stores a most reliable data, and wherein determining the master source includes determining whether one of the first data instances indicates a recording state of one of the programs, and wherein when determining that the one of the first data instances does not indicate the recording state of the one of the programs, the instructions comprise further instructions to:
determine whether the one of the programs associated with the one of the first data instances has the recording state that indicates the one of the programs is scheduled to be recorded;

update, in response to the determination of the master source for each first data instance that differs, one of the network device or the one of the user devices based on the master source, wherein when the network device is the master source, the one of the user devices is updated with a differing first data instance, and when the one of the user devices is the master source, the network device is updated with a differing second data instance; and provide, in response to the update, the DVR service based on an updated portion of the first recording information stored at the network device, an updated second recording information stored at the one of the user devices, or both.

17. The non-transitory, computer-readable storage medium of claim 16, wherein when the one of the user devices is updated with the differing first data instance, the instructions further comprise instructions to:

transmit, to the one of the user devices, the differing first data instance.

18. The non-transitory, computer-readable storage medium of claim 16, wherein when the network device is updated with the differing second data instance, the instructions further comprise instructions to:

store the differing second data instance to create the updated portion of the first recording information.

19. The non-transitory, computer-readable storage medium of claim 16, wherein the second recording information includes information indicating a recording identifier, a recording hash, and a recording state.

20. The non-transitory, computer-readable storage medium of claim 16, wherein when determining that the one of the first data instances does indicate the recording state of the one of the programs, the instructions further comprise instructions to:

identify a recording state indicated by a corresponding one of the second data instances;

compare the recording state indicated by the one of the first data instances with the recording state indicated by the corresponding one of the second data instances; and determine the master source based on the comparison of the recording state indicated by the one of the first data instances with the recording state indicated by the corresponding one of the second data instances.

\* \* \* \* \*